(12) United States Patent
Engstrom et al.

(10) Patent No.: US 10,452,590 B2
(45) Date of Patent: Oct. 22, 2019

(54) MULTI-POINT TO POINT USB SYSTEM

(71) Applicants: Eric Engstrom, New York, NY (US); Brad Bargen, New York, NY (US)

(72) Inventors: Eric Engstrom, New York, NY (US); Brad Bargen, New York, NY (US)

(73) Assignee: 3X3, Wilmington, DE (US)

( * ) Notice: Subject to any disclaimer, the term of this patent is extended or adjusted under 35 U.S.C. 154(b) by 0 days.

(21) Appl. No.: 15/823,926

(22) Filed: Nov. 28, 2017

(65) Prior Publication Data

US 2019/0163660 A1    May 30, 2019

(51) Int. Cl.
*G06F 13/40* (2006.01)
*G06F 13/42* (2006.01)
*G06Q 20/20* (2012.01)

(52) U.S. Cl.
CPC ...... *G06F 13/4081* (2013.01); *G06F 13/4265* (2013.01); *G06F 13/4282* (2013.01); *G06F 2213/0042* (2013.01); *G06Q 20/20* (2013.01)

(58) Field of Classification Search
None
See application file for complete search history.

(56) References Cited

U.S. PATENT DOCUMENTS

2013/0262248 A1* 10/2013 Kim ............... G07G 1/0018
                                                            705/17
2014/0250239 A1*  9/2014 Lambert ............. H04L 45/54
                                                            709/242
2017/0308492 A1* 10/2017 Vajravel ............ G06F 13/385

* cited by examiner

*Primary Examiner* — Farley Abad
*Assistant Examiner* — Dayton Lewis-Taylor
(74) *Attorney, Agent, or Firm* — Buckley, Maschoff & Talwalkar LLC (57) ABSTRACT

Provided are a system and method for combining USB data streams. In one example, the method may include receiving, via an input port, a first universal serial bus (USB) input signal from a first device that is connected to the input port, receiving, via an interface, a second USB input signal from a second device, combining data from the first USB input signal and data from the second USB input signal to generate a combined USB data signal, and outputting, via an output port, the combined USB data signal to a third device that is connected to the output port. The system and method described herein can improve USB data transfer by combining USB data from multiple USB streams into a single USB output stream.

18 Claims, 9 Drawing Sheets

MULTI-POINT TO POINT USB SYSTEM

Universal Serial Bus (USB) is a standard cable connection interface for personal computers and consumer electronic devices. USB is typically used for short-distance digital data communications between computing devices and computer peripherals such as keyboards, pointer devices (e.g., a mouse), digital cameras, printers, portable media players, disk drives, network adapters, and the like. USB may also be used to supply electric power to a device. USB has largely replaced many of the earlier interfaces such as serial ports, parallel ports, power chargers, and the like. A host device is typically outfitted with one or more USB ports which are each capable of both input and output of data. In order to connect two devices through USB, a user may plug an end of a cable into a USB port of a host device (e.g., personal computer) and plug the other end of the cable into a USB port of a peripheral device (e.g., a keyboard, printer, external drive, etc.)

In some cases, a USB host device may be outfitted with multiple USB ports enabling the host device to connect to multiple peripheral devices at once. However, as per the USB standard, communication between a USB host device and a USB peripheral device is "point-to-point." A traditional point-to-point architecture refers to a wire or other direct connection that links only two endpoints (e.g., computing devices, circuits, etc.) as opposed to other network architecture topologies which can link many communication devices to one another. As a result, USB communication is limited. For example, two USB host devices cannot communicate directly with each other. Likewise, two USB peripheral devices cannot communicate directly with each other.

An example of computing system that relies on USB communication is a point-of-sale (POS) which is also referred to as a point of purchase (POP). At the point of sale, the merchant, vendor, or seller, calculates an amount owed by a customer, indicates that amount, may prepare an invoice for the customer (which may be a cash register printout), and indicates the options for the customer to make payment. It is also the point at which a customer makes a payment to the seller in exchange for goods or for provision of a service. After receiving payment, the merchant may issue a receipt for the transaction, which is usually printed but is increasingly being dispensed with or sent electronically. The point of sale often includes multiple devices such as a POS terminal, a scanner, a printer, and the like, which are typically connected to each other via USB cables.

SUMMARY

In one general example embodiment, provided is a multi-point-to-point apparatus that may include one or more of a first input configured to receive a first universal serial bus (USB) input signal from a first device that is connected to the first input, a second input configured to receive a second USB input signal from a second device that is connected to the second input, a processor configured to combine data from the first USB input signal and data from the second USB input signal to generate a combined USB data signal, and an output configured to output the combined USB data signal to a third device that is connected to the output.

In another general example embodiment, provided is computer-implemented method that may include one or more of receiving, via an input port, a first universal serial bus (USB) input signal from a first device that is connected to the input port, receiving, via an interface, a second USB input signal from a second device, combining data from the first USB input signal and data from the second USB input signal to generate a combined USB data signal, and outputting, via an output port, the combined USB data signal to a third device that is connected to the output port.

In another general example embodiment, provided is a computing system that may include one or more of an input configured to receive product information associated with a transaction which is transmitted from a reading device to a point-of-sale (POS) terminal, an output configured to output the product information to the POS terminal, and a processor configured to intercept the product information received by the input, receive a user identification of a user associated with the transaction, and automatically retrieve a benefit to be included in the transaction from a remote server based on the product information and the received user identification, and the processor may be further configured to add information about the benefit to the product information that is output to the POS terminal.

In another general example embodiment, provided is a method that may include one or more of receiving a user identification of a user associated with a transaction, receiving product information associated with the transaction which is transmitted from a reading device to a point-of-sale (POS) terminal, intercepting the received product information, and automatically retrieving a benefit to be included in the transaction from a remote server based on the product information and the received user identification, and outputting the product information and information about the automatically retrieved benefit to the POS terminal.

Other features and aspects may be apparent from the following detailed description, the drawings, and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth to explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

USB communication architecture has traditionally been a point-to-point (P2P) communication protocol. In this type of communication architecture, a host USB device such as a desktop computer communicates with a peripheral USB device such as a keyboard, mouse, printer, network adapter, etc., via a point-to-point connection. Here, the host device includes one or more USB ports that are able to connect (usually via a cable) with one or more USB peripheral devices. In this architecture, each USB peripheral device has a point-to-point connection with the USB host device. However, the point-to-point communication limits the ability of data communication between more than two devices.

To address this issue, the example embodiments provide for a multi-point-to-point (MP2P) USB device that is capable combining USB data signals from multiple USB devices and outputting the combined USB data via a USB port to a single USB host device. For example, the device may combine a USB resource block (URB) received from a first USB device with a URB received from a second USB device to generate a combined USB output signal including both URBs. In some embodiments, the MP2P USB device may function as a multi-point-to-multi-point USB device as well.

The MP2P USB device includes a first USB port configured to connect to a first USB peripheral device such as a product scanner or a printer. In operation, the first USB peripheral device transmits a USB signal to the MP2P USB device via the first USB port. The MP2P USB device also includes a second USB port configured to connect to a second USB peripheral device such as a point-of-sale (POS) terminal. In operation, the MP2P USB device receives the USB signal from the first USB device via the first USB port. The USB signal passes through the MP2P USB device and is output to the second USB device via the second USB port. Here, the USB signal may be unchanged (or relatively unchanged) such that only a timestamp is changed while a payload of the USB signal remains unchanged, etc. In this setup, the MP2P USB device forms a software wire between the first and second USB peripheral devices.

According to various embodiments, the MP2P USB device may also include a network interface (wired or wireless) that is capable of communicating with a network device such as a web server, cloud storage, etc. The MP2P USB device may siphon or otherwise capture USB data flowing from the first USB device (e.g., product scanner) to the second USB device (e.g., POS terminal, and transmit the captured USB data to the network device via the network interface. In response, the network device may transmit another USB data signal to the MP2P USB device. Accordingly, the MP2P USB device may combine the USB data signal received from the first USB device (e.g., product scanner) with the USB data signal received from the network device (e.g., web server) to generate a combined USB data signal which is output to the second USB device (e.g., the POS terminal).

In some embodiments, the system may include additional USB peripheral devices such as a printer, and the like which are also connected via a USB port to the MP2P USB device and which can transmit and receive USB data to and from the MP2P USB device. In this example, the MP2P USB device may also siphon USB data transmitted between the POS terminal and the printer and transmit the siphoned USB data to the network device. In addition, the MP2P USB device may insert USB data into the USB data transmitted between the POS terminal and the printer. The inserted USB data may be determined based on a user ID received by the network device from the MP2P USB device. Here, the USB data to be added may be intentionally added to the stream to thereby insert a discount or a reward into the payment process for which the user has previously registered. In other words, the USB data from the network device which is being inserted into the USB stream from the USB peripheral device by the MP2P USB device is not random data.

In various aspects, the MP2P USB device is described as being used in a payment checkout terminal system that includes a product scanner, a POS terminal, a printer, and the like. Here, the MP2P USB device may intercept product information scanned by the product scanner that is transmitted to the POS terminal, and route the intercepted product information (as well as other information such as customer/purchaser information) to the network device. In response, the network device may access a user account associated with the customer and detect previously earned benefits, rewards, coupons, etc. of the customer. The network device may transmit information about the detected benefit to the MP2P USB device as a USB data signal, and the MP2P USB device may automatically insert the benefit information into the USB data stream between the product scanner and the POS terminal. Accordingly, the benefit can be applied at the point of sale without the user having to expose a coupon or open an email for scanning by the product scanner.

Figure 1:
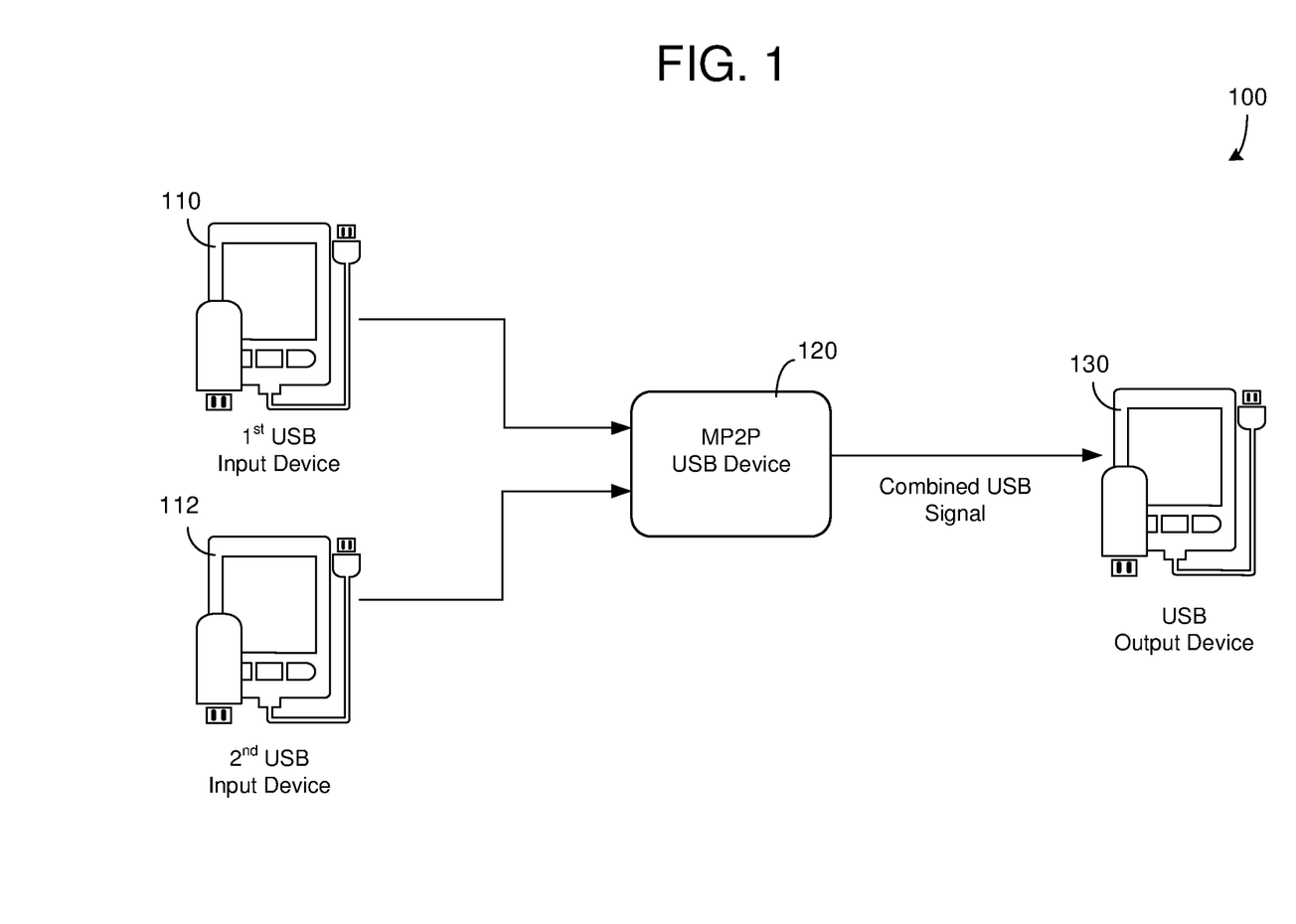
FIG. 1 is a diagram illustrating a system including a multi-point-to-point ("MP2P") USB device in accordance with an example embodiment.
Figure 2:
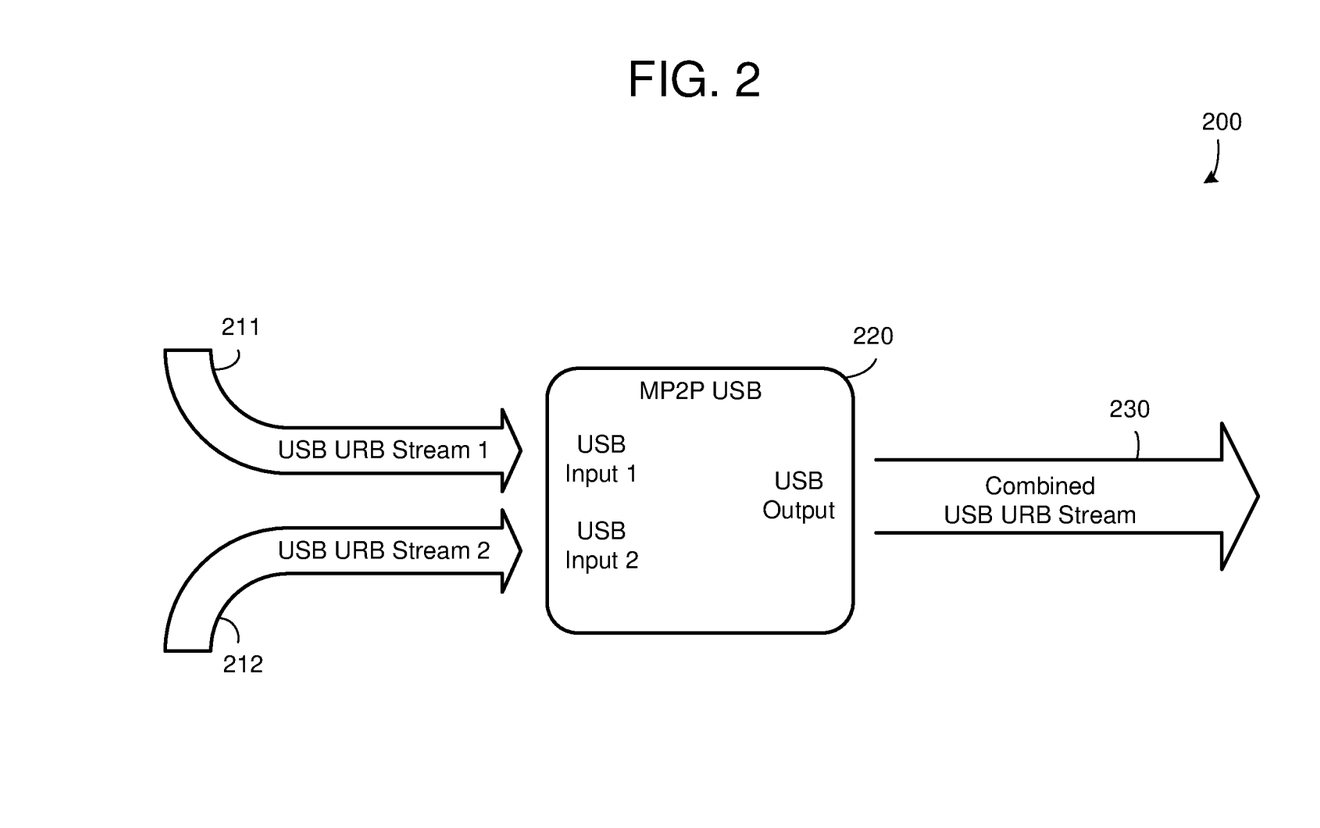
FIG. 2 is a diagram illustrating a process of combining USB input streams in accordance with an example embodiment.

FIG. 1 illustrates a system 100 including a multi-point-to-point ("MP2P") device 120 in accordance with an example embodiment, and FIG. 2 illustrates a process 200 of combining USB input streams in accordance with an example embodiment. Referring to the system 100 of FIG. 1, a first USB input device 110 is connected to the MP2P device 120 via a USB connection such as a USB port. The USB port may be a USB 2.0, 3.0, 3.1, and the like, and may include standard format connection and pinouts. The USB port may be used for both data input and data output. For example, the USB port may include 4 pins, 5 pins, and the like, and may include different types such as type A, type B, and the like. In this example, a second USB input device 112 is connected to the MP2P device 120. The second USB device 112 may be connected via a USB port. As another example, the second USB device 112 may be connected to a network interface of the MP2P device and communicate via a network (wired or wireless) such as the Internet, a private network, and the like. Both the first USB device 110 and the second USB device 112 may include USB device drivers capable of generating USB format signals.

In the example of FIG. 1, the MP2P USB device 120 is also connected to a USB output device 130. Here, the USB output device 130 may be a USB host device such as a computer, POS terminal, and the like. Meanwhile, the first USB input device 110 and the second USB input device 112 may be peripheral USB devices and/or host USB devices. The MP2P USB device includes logic and circuitry capable of receiving a first USB input signal from the first USB input device 110 and receiving a second USB input signal from the second USB input device 112, and combing data from both the first and second USB input signals to generate a combined USB data output signal that is output to the USB output device 130. FIG. 2 illustrates an example of USB data being combined.

As shown in FIG. 2, a first USB stream of data 211 is received by the MP2P USB apparatus 220 and a second USB stream of data 212 is also received by the MP2P USB apparatus 220. Both USB streams 211 and 212 may include one or more respective USB resource blocks (URBs) which are based on USB format. The URB structure is used by USB client drivers to describe USB request blocks (URBs) that send requests to the USB driver stack. The URB structure defines a format for all possible commands that can be sent to a USB device. An URB consists of all relevant information to execute any USB transaction and deliver the data and status back. Execution of an URB is inherently an asynchronous operation, e.g., the usb_submit_urb( ) call returns immediately after it has successfully queued the requested action. Also, transfers for one URB can be canceled with usb_unlink_urb( ) at any time. Each URB has a completion handler, which is called after the action has been successfully completed or canceled. The URB also contains a context-pointer for passing information to the completion handler. Each endpoint for a device logically supports a queue of requests. The queue can be filled so that the USB hardware can still transfer data to an endpoint while the driver handles completion of another. This maximizes use of USB bandwidth, and supports seamless streaming of data to (or from) devices when using periodic transfer modes.

In the example of FIG. 2, the MP2P USB apparatus 220 receives both USB data streams 211 and 212 (e.g., from two USB devices) and combines the USB data into a single combined USB data stream. For example, the MP2P USB apparatus 220 may embed an URB from the second USB data stream 212 into an URB of the USB data stream 211, and output/route the combined USB URB stream 230 to a third USB device. As another example, the MP2P USB apparatus may append or prepend an URB from the second USB data stream 212 to an URB from the USB data stream 211, and the like. The combined USB URB stream 230 may be output via a single USB port on the MP2P USB apparatus 220 to a USB device such as a USB host device or USB peripheral device.

Figure 3:
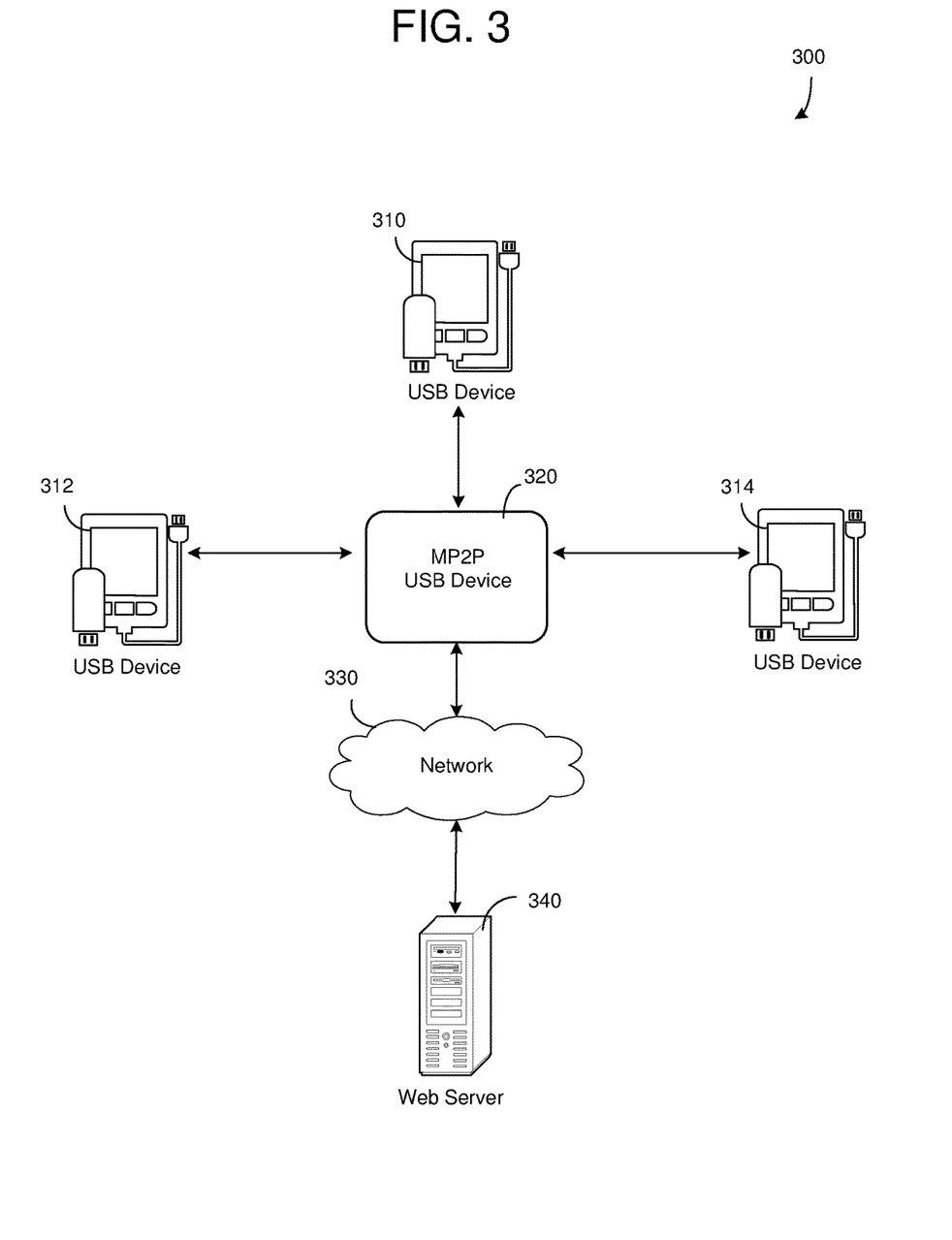
FIG. 3 is a diagram illustrating a system including a MP2P USB device in accordance with another example embodiment.
Figure 4:
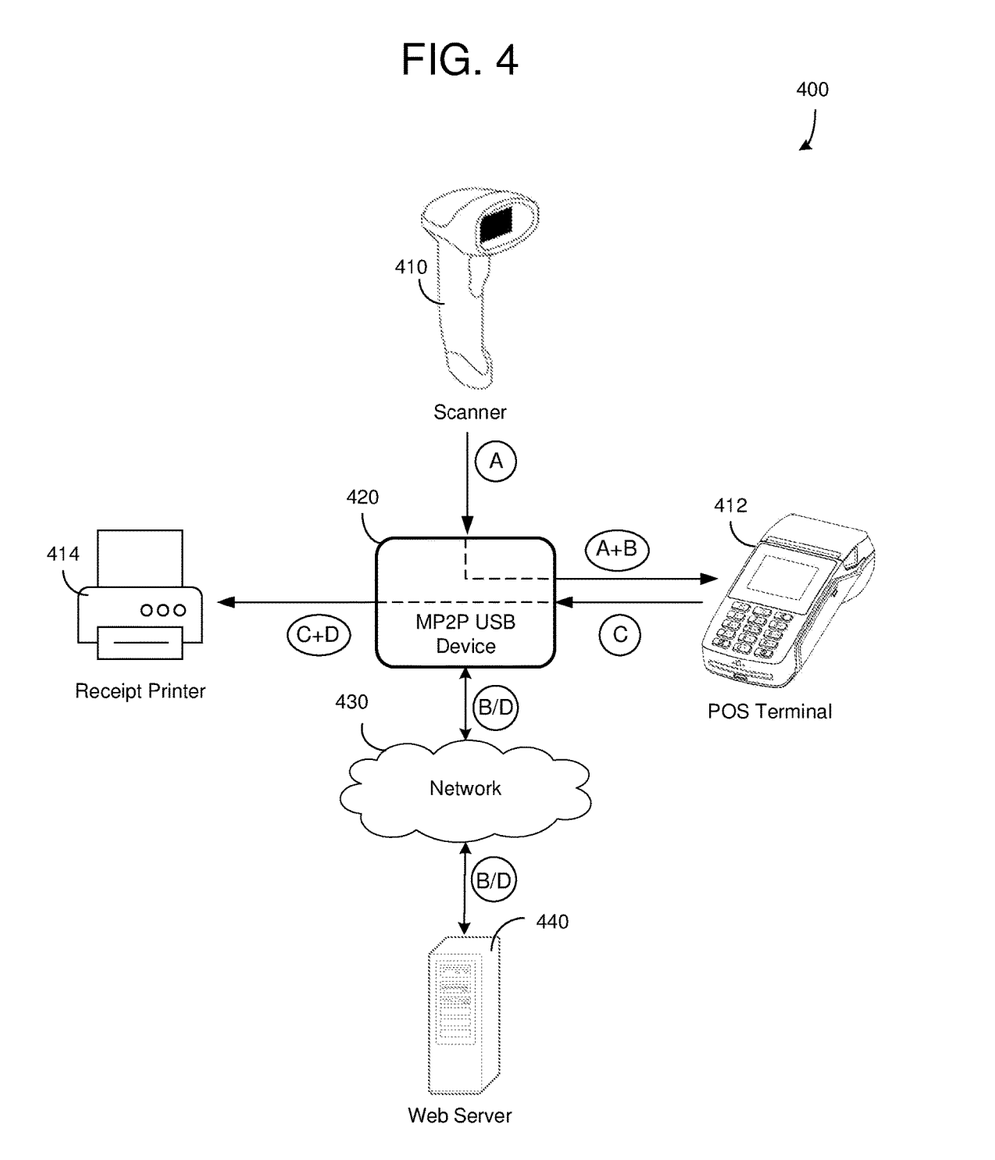
FIG. 4 is a diagram illustrating a point-of-sale system including a MP2P USB device in accordance with an example embodiment.

FIG. 3 illustrates a system 300 including a MP2P USB device in accordance with another example embodiment, and FIG. 4 illustrates a point-of-sale system 400 including a MP2P USB device in accordance with an example embodiment. Referring to the example of FIG. 3, in the system 300 first, second and third USB devices 310, 312, and 314 are each connected to the MP2P USB device 320. The connections may be local connections via a USB port/cable. As another example, the USB connections may be wireless or via a network through one or more USB virtual networking protocols. One or more of the USB devices 310, 312, and 314 may be USB host devices and one or more of the USB devices 310, 312, and 314 may be USB peripheral devices. As a non-limiting example, USB device 314 may be a USB host device while USB devices 310 and 312 are USB peripheral devices that are configured to communicate directly with the USB host device. In this example, each of the USB devices 310 and 312 (peripherals) may transmit and receive USB data to and from the USB device 314 (host). As another example, the USB devices may transmit data in sequence. For example, USB device 310 may transmit data to USB device 314, and USB device 314 may transmit data to USB device 312. There is no limitation on the ordering, sequencing, and types of USB devices that may be included in the system 300.

In addition to the USB devices 310, 312, and 314, the system 300 also includes a web server 340 that is connected to the MP2P USB device 320 via a network 330 such as the Internet, a private network, or the like. In this example, the web server 340 may be a database, a server, a cloud platform, or the like. Also, the web server 340 may have installed therein a USB device driver that enables the web server 340 to transmit and receive USB signals and to decipher USB data. For example, the USB device driver may enable the web server 340 to transmit and receive URBs to and from the MP2P USB device 320. It should also be understood that the web server 340 may be replaced with a local USB device that is connected to the MP2P USB device 320 via a cable or other local connection. However, by incorporating a network interface into the MP2P USB device 320, it is possible for the MP2P USB device 320 to retrieve USB data from a remote web-based source and incorporate the USB data into a local USB communication system.

The system 400 shown in FIG. 4 is similar to the system 300 shown in the example of FIG. 3. However, in the example of FIG. 4, the USB devices are identified as a scanner 410 for scanning product information off of an item (e.g., a UPC code, etc.) and transmitting the product information to a POS terminal 412. Furthermore, the POS terminal 412 may perform a payment transaction with a user and print out a receipt to a printer 414. In the example of FIG. 4, the POS terminal 412 corresponds to a USB host device while the scanner 410 and the printer 414 correspond to USB peripheral devices. In this example, each of the scanner 410, POS terminal 412, and printer 414 are connected via USB connection to MP2P USB device 420. Furthermore, the system 400 also includes a web server 440 connected to the MP2P USB device 420 via a network 430. Here, the web server 440 may include a USB device driver that enables the web server 440 to transmit and receive USB data to and from the MP2P USB device 420.

In operation, the product scanner 410 may scan a product which generates and transmits a USB data signal A from the product scanner to the POS terminal 412. Here, the USB data signal A may be intercepted by the MP2P USB device 420. For example, the MP2P USB device 420 may siphon off an URB from the USB data signal A which includes product information and also any user identification that is provided by the user at the scanner 410. As another example, the user identification may be inserted by the user via a user interface of the MP2P USB device 420. In response to receiving the USB data signal A and the user identification, the MP2P USB device 420 may transmit the USB data signal A, or a component thereof, and the user identification to the web server 440 via the network 430. Based on the product information and the user identification, the web server 440 may identify a benefit such as a coupon, reward, loyalty program, or the like, that is linked with the product scanned by the scanner 410 and that is also linked to a user account linked to the user identification. The web server 440 may transmit a USB data signal B including the benefit to the MP2P USB device 420. According to various aspects, the MP2P USB device 420 may combine USB data from both the USB data signal A received from the scanner 410 with USB data from the USB data signal B received from the web server 440, and transmit the combined USB signal to the POS terminal 412.

As another example, the POS terminal 412 may transmit a USB data signal C to the printer 414 which includes receipt information as well as payment information, product information, and the like. In response, the MP2P USB device 420 may intercept the USB data signal C and siphon off USB data such as an URB and transmit the USB data to the web server 440 via the network 430. As an example, the USB data signal C may include an identification of a transaction that is not associated with an item scanned by the product scanner 410 but rather that is inserted by the MP2P USB device 420. The web server 440 may identify additional USB data that is to be inserted with the USB data signal such as a voucher, certificate, coupon, benefit, or the like, for the user to use in a separate transaction or to offer as proof that the user paid for an additional transaction. Accordingly, the web server 440 may provide a USB data signal D to the MP2P USB device 420 including the voucher or other information, and the MP2P USB device may combine the USB data signal D with the USB data signal C, and output the combined signal the printer 414.

Figure 5:
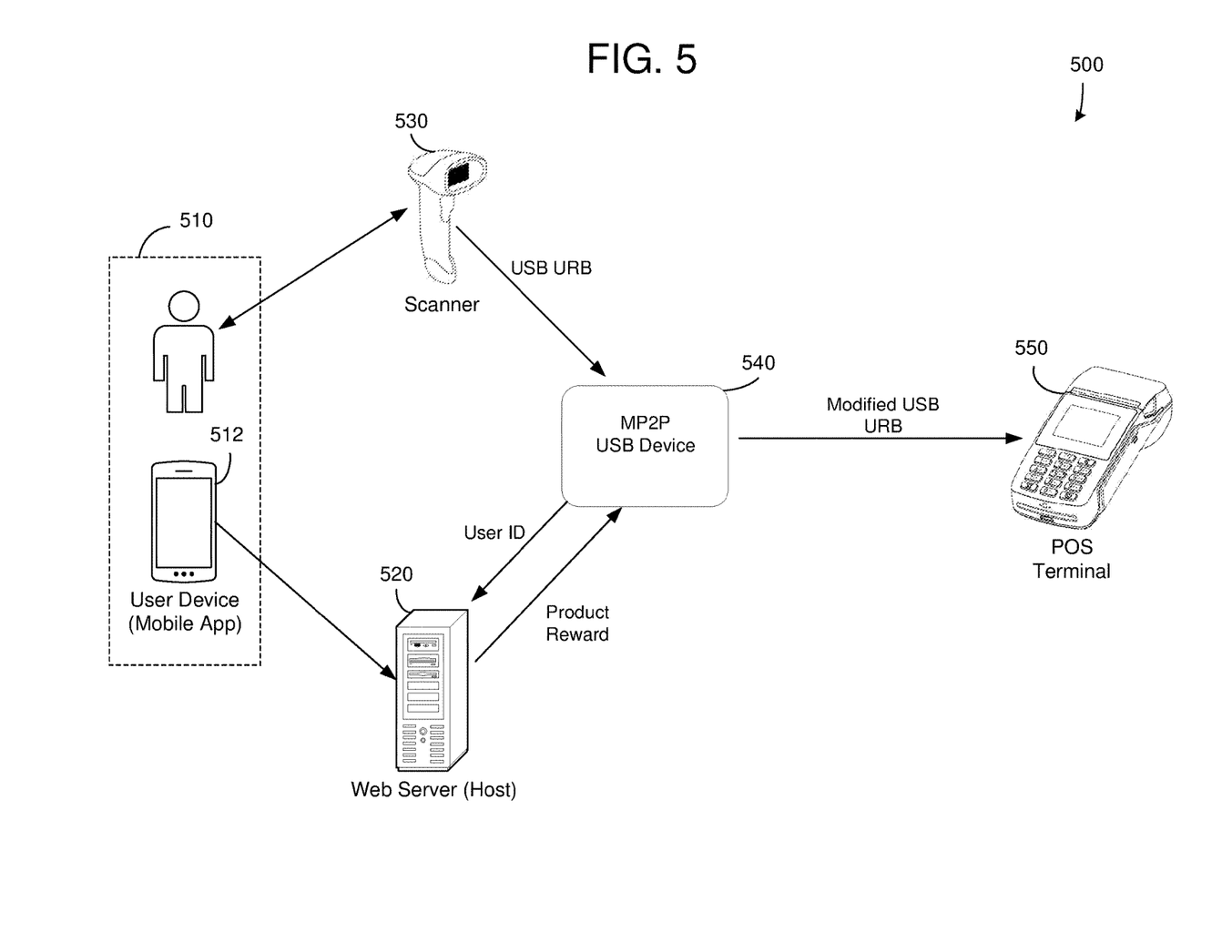
FIG. 5 is a diagram illustrating a POS system for processing a transaction in accordance with an example embodiment.

FIG. 5 illustrates a POS system 500 for processing a transaction in accordance with an example embodiment. Referring to the example of FIG. 5, the POS system 500 includes a multi-point-to-point (MP2P) USB device 540 which may receive USB data from a product scanner 530 and USB data from a web server 520, combine the received USB data into a combined USB signal, and output the signal to a POS terminal 550. In this example, the web server 520 hosts a mobile application which is executing on a user device 512 that is associated with a user 510. For example, an identification of the user device 512 and/or the user 510 may be stored at the web server 520 and used to identify the user 510 as an owner of a user account of the mobile application. The web server 520 may host many different users in this way. Each user may have their own respective user account and offers, rewards, loyalty programs, etc., included therein and accessible to the respective user thereof.

In operation, the user 510 may manipulate the user device 512 to scan in benefits, rewards, coupons, or the like, such as capturing an image of a coupon, barcode, etc., from a poster, a newspaper, a magazine, a store isle, and the like, using a camera or other scanning component included in the user device 512. As another example, the user 510 may upload coupons received via email, text message, electronic messages, and the like, to the web server 520 through the mobile application executing on the user device 512 or via another device. For example, the coupon may be shown on a website and the user 512 may simply click on a link and the coupon may be automatically stored in their user account at the web server 520. There is no limitation to the ways and means which the user 510 may store offers, rewards, discounts, and other benefits in their user account at the web server 520.

The MP2P USB device 540, the product scanner 530, and the POS terminal 550 may be disposed within a merchant or vendor location such as a brick-and-mortar store, a kiosk, a back-end warehouse connected to a website, and the like. When the user 510 desires to purchase a product, for example, a baseball glove, the user 510 may approach the counter and give the product to the clerk for a check-out and payment process. In this example, the scanner 530 may scan a barcode, QR code, UPC code, or the like, of the product (e.g., baseball glove). Typically, the product scanner 530 transmits the scanned information as a USB resource block (URB) directly to the POS terminal 550. However, according to various embodiments, the MP2P USB device 540 may include a USB port for receiving the USB signal from the product scanner 530 and a USB port for outputting the USB signal to the POS terminal 550. In addition, the MP2P USB device 540 may include circuitry which captures/intercepts/siphons the USB data (e.g., one or more URBs) from the product scanner 530 as it is being transmitted to the POS terminal 550. In this example, the MP2P USB device 540 may intercept the USB data without changing the USB data such that a payload of the USB data (e.g., product information, user information, scanner information, etc.) remains unchanged as it passes through to the POS terminal 550. In this case, the only thing that may be changed is a timestamp of the signal as it enters and leaves the MP2P USB device 540.

According to various embodiments, the MP2P USB device 540 may transmit the siphoned/intercept/captured USB data from the product scanner 530 to the web server 520 which is the host of the mobile application executing on the user device 510. The MP2P USB device 540 may be connected to the web server 520 via a network connection (e.g., wired, wireless, etc.) In some embodiments, the USB data (i.e., product information) captured from the product scanner 530 may also include a user identification of the user 510 which may be scanned from a card, tag, fob, or the like. As another example, the user may input their identification to a keypad of the scanner 530, a keypad of the MP2P USB device 540, spoken to the cashier who inputs the user identification into the MP2P USB device 540, and the like. Accordingly, the MP2P USB device 540 may also provide the web server 520 with a user identification that is associated with the mobile application executing on the user device 512.

In response to receiving both the product identification information (e.g., baseball glove) and the user identification, the web server 520 may determine whether the user 510 has previously scanned or otherwise stored a benefit with respect to the product being purchased. When more than one product is being purchased, the web server 520 may attempt to find benefits for each and every product included in the purchase transaction. In this example, the benefits may be uploaded to the web server 520 prior to the user 510 attempting to purchase the item. For example, the benefit may be uploaded before the product code is scanned by the scanner 530 (e.g., a day before, a week before, a month before, a year before, etc.) In this example, the web server 520 identifies a coupon/reward that is associated with the product scanned by the scanner 530 (e.g., the baseball glove) and provides information about the coupon to the MP2P USB device 540. For example, and according to various embodiments, the web server 520 may provide the coupon information to the MP2P USB device 540 in the form of USB data (e.g., one or more URBs).

In response to receiving the product information from the scanner 530 and the reward information from the web server 520, the MP2P USB device 540 may generate a combined signal including USB data input from both the scanner 530 and the web server 520 to generate a combined or modified USB data signal. That is, the MP2P USB device 540 may deliberately insert additional transaction based USB data into the USB data stream transmitted from the scanner 530 to the POS terminal 550 to generate a modified USB data signal. The inserted USB data may be transaction-specific, user-specific, and the like, and may be used to augment scanned USB data based on particular features of the user information and/or the product that is scanned. Here, the combined USB data signal may include one or more URBs received from the scanner 530 combined with one or more URBs from the web server 520. As an example, the MP2P USB device 540 may embed an URB from the web server 520 within an URB received from the product scanner 530. As another example, the MP2P USB device 540 may append, post-pend, or the like, the URBs to each other. Furthermore, the MP2P USB device 540 may output the combined USB data signal to the POS terminal 550. For example, the combined USB data signal may include the product information such as identification and price, and also include a coupon/reward that is automatically applied to the purchase price by the MP2P USB device 540.

In the example of FIG. 5, the MP2P USB device 540 enables the user 510 to scan or otherwise upload coupons and other rewards at anytime without having to keep the coupon stored on the user device (e.g., as an email, e-ticket, SMS message, etc.). Rather, the coupon can be stored by the web server 520. When the user checks-out with the merchant who operates the scanner, MP2P USB device 540, and the POS terminal 550, the user does not need to provide the coupon/reward to the merchant. Rather, the MP2P USB device 540 extracts payment information and user information and automatically searches for and downloads any product offers/coupons that the user 510 has previously stored with respect to items included in the purchase. Furthermore, the MP2P USB device 540 adds these coupons to the payment transaction automatically.

Figure 6:
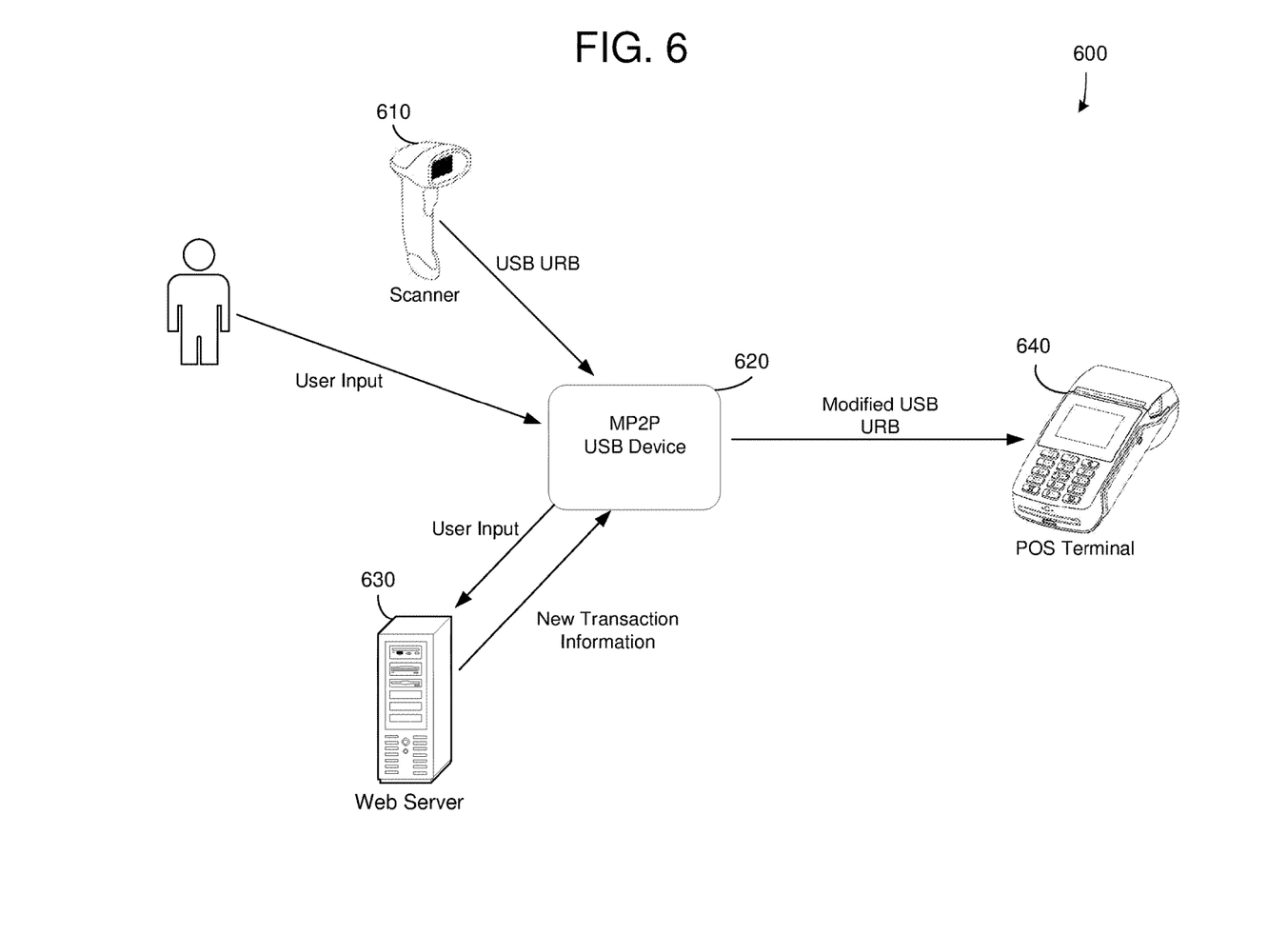
FIG. 6 is a diagram illustrating a POS system for processing a transaction in accordance with another example embodiment.

FIG. 6 illustrates a POS system 600 processing a transaction in accordance with another example embodiment. Referring to the example of FIG. 6, the POS system 600 MP2P USB device 620 which may receive USB data from a product scanner 6100 and USB data from a web server 630, combine the received USB data into a combined USB signal, and output the signal to a POS terminal 640. In this example, the user does not need to scan coupons or benefits ahead of time and store them at the web server. Rather, in this example, MP2P USB device 620 can add a new transaction (e.g., a new item or service) to the purchase transaction that is not scanned by the product scanner 630. One such non-limiting example is boxes of girl scouts cookies which can be added to a transaction at the POS terminal 620 without having to scan a product ID of the girl scout cookies. As another example, the MP2P USB device 620 could add a donation to the transaction.

In this example, the user may enter one or more inputs via a user interface of the MP2P USB device 620. Here, the user interface may display a query on its screen asking a user whether they would be interested in adding girl scout cookies to their purchase transaction (or some other additional transaction). When the user selects the option to add the cookies to the transaction, a price/value of the cookies (or other item) can be added to the transaction in the form of a USB data signal that is provided from the web server 630. In this example, the MP2P USB device 620 may transmit a product identification to be added to the transaction to the web server 630.

In response, the web server 630 can generate a USB data signal (e.g., an URB) to be added to the purchase transaction and transmit the USB data signal to the MP2P USB device 620. The MP2P USB device 620 may combine the added transaction data (e.g., URB) provided from the web server 630 with a USB signal provided from the scanner 610 identifying one or more products also being purchased by the user during the transaction, to generate a combined or modified USB data signal. Furthermore, the MP2P USB device 620 may output the combined USB data signal including the newly added product information to the POS terminal 640. In response, the POS terminal 640 may print out or send to a printer device (not shown) to print out information about the purchase of the newly added item such as a voucher or other ticket. Accordingly, when the user leaves the store they can hand the ticket to the girl scouts and receive a box of girl scout cookies. Also, the web server 630 may add the purchase to an account associated with the girl scouts. Accordingly, the user may add a new transaction to their purchase and pay for the transaction using a credit card without having to pay for the item in cash.

Figure 7:
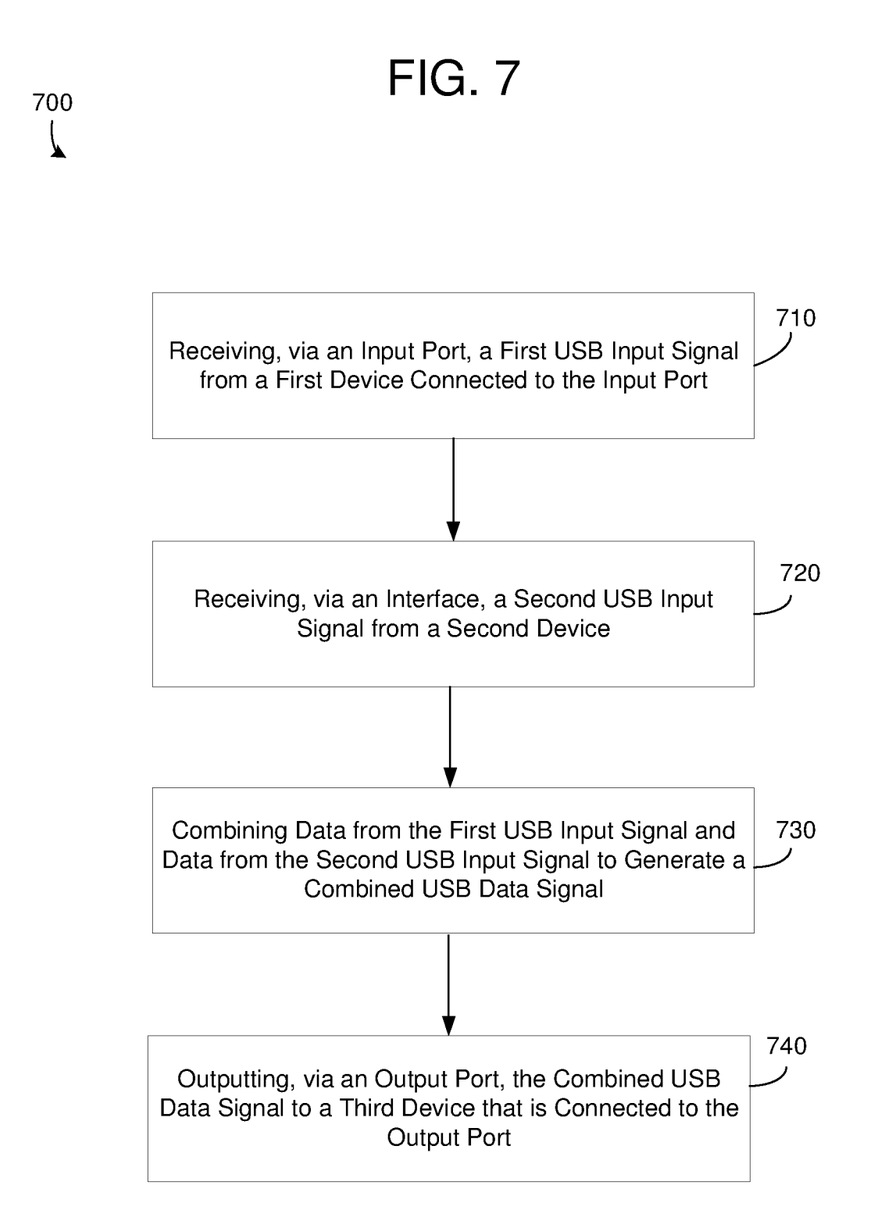
FIG. 7 is a diagram illustrating a method of combining data from multiple USB devices in accordance with an example embodiment.

FIG. 7 illustrates a method 700 of combining data from multiple USB devices in accordance with an example embodiment. For example, the method 700 may be performed by the MP2P apparatus shown in one or more of the examples herein. The apparatus may include a box having a housing and a plurality of USB ports which are set as interfaces on the outer peripheral of the housing. The apparatus may also include a network interface, a power supply, circuitry for combining USB signals, and the like. Referring to FIG. 7, in 710, the method includes receiving, via an input port, a first USB input signal from a first device that is connected to the input port. The first USB input signal may include product information such as a UPC code, QR code, and the like, which is scanned by the first device such as a product scanner, or the like, and which is intended for a POS terminal.

For example, the input port may be a USB port that is directly connected to the first USB device via a cable or a wire. The first device may be a USB peripheral device such as a printer, a product scanner, and the like, or it may be a USB host device. The first USB signal may include product information generated by the USB peripheral device reading or otherwise scanning a code from the product. In addition to receiving the first USB signal, the apparatus may also receive a user identification such as a loyalty card ID, a rewards card ID, a username, an email address, a phone number, or the like, which identifies a user. The user identification may be associated with a digital wallet, a mobile application, and the like. The user identification may be extracted from the first USB signal in an example in which the first device scans a loyalty card, tag, or the like, or receives an input such as an email or a phone number from a user. As another example, the user identification may be input via a keypad/user interface of the multi-point to point USB apparatus.

In response to receiving the first USB signal from the first device, the method may extract product information from the signal. For example, the method may include extracting one or more URBs in their entirety, or partially from the USB signal. The URB may include a product's UPC code, QR code, or the like. Furthermore, the method may include transmitting the extracted product information and the user identification to a remote server such as a web server. In some embodiments, the method may include extracting the URB in its entirety from the first USB input signal while leaving a payload of the URB within the first USB input signal unchanged, and transmitting the extracted URB to the second device.

In 720, the method includes receiving, via an interface, a second USB input signal from a second device. In some embodiments, the input port receiving the first signal may be a USB port while the interface receiving the second USB input signal may be a network interface (e.g., wired or wireless) receiving the USB signal via a network such as the Internet, a private network, and the like. In some embodiments, the second device may be a computing system such as a web server, a cloud platform, a database, and/or the like, which communicates with the apparatus via the network. It should also be appreciated that the second device may be a USB peripheral device, a USB host device, or the like, which is connected to the apparatus through a second USB port of the apparatus instead of a network interface. Also, the first and second USB input signals may be generated by a USB device driver of the first and second devices, respectively.

The second USB input signal may be received in 720 from the second device in response to the extracted product information and the user identification being transmitted to the remote server. As an example, the second device may be a web server such as a host server for a mobile application, digital wallet, or the like. The second USB input signal may include a benefit such as a rewards program, a loyalty program, a coupon, or the like, associated with a purchase transaction for the product scanned by the first device and identified by the first USB input signal. The mobile application hosted by the second device may be installed on a user device of a consumer that is requesting purchase of the product scanned by the first device. In this example, the user identification may be used to identify or otherwise link a user of the mobile application to the product being purchased. The web server may also identify whether the user has any user-specific benefits (e.g., coupons, rewards, etc.) previously added to that user's account for the specific product the user is attempting to purchase. For example, the web server may determine an identification of the product from the product information (e.g., UPC code, product code, etc.) provided from the network interface of the apparatus. In response to determining the user has previously added or otherwise submitted a benefit associated with the product to the web server, the web server may transmit the benefit to the apparatus and the apparatus may automatically inject the benefit into the USB input stream scanned by the scanner and intended for the POS terminal.

In 730, the method includes combining data from the first USB input signal and data from the second USB input signal to generate a combined USB data signal, and in 740, the method includes outputting, via an output port, the combined USB data signal to a third device that is connected to the output port. For example, the output port may include another USB port that connects to the third device via another cable. In some embodiments, the first USB input signal may include a first URB received from the first device and the second USB input signal may include a second URB received from the second device. In this example, the generating the combined USB data signal may include combining the first and second URBs for example, at least one of embedding the second URB within the first URB, appending the second URB to the first URB, prepending the second URB to the first URB, and the like.

According to various embodiments, the USB port connected to the first device (e.g., the product scanner) may form a software wire with the USB port connected to the output device (e.g., the POS terminal). In this example, the input port may receive the USB signal from the scanner and the output port may pass the received USB signal to the POS terminal such that a payload of the USB signal remains unchanged. However, the apparatus may siphon/extract data from the USB signal (e.g., product information, user information, etc.), send the siphoned data to a remote web server, and download and insert information into the signal (e.g., a reward, a benefit, a discount, etc.) while maintaining the payload of the USB signal as it passes from the input port to the output port. Accordingly, the apparatus may automatically download and apply discounts which are registered for by the user well in advance (e.g., one day, one week, one month, and the like).

Figure 8:
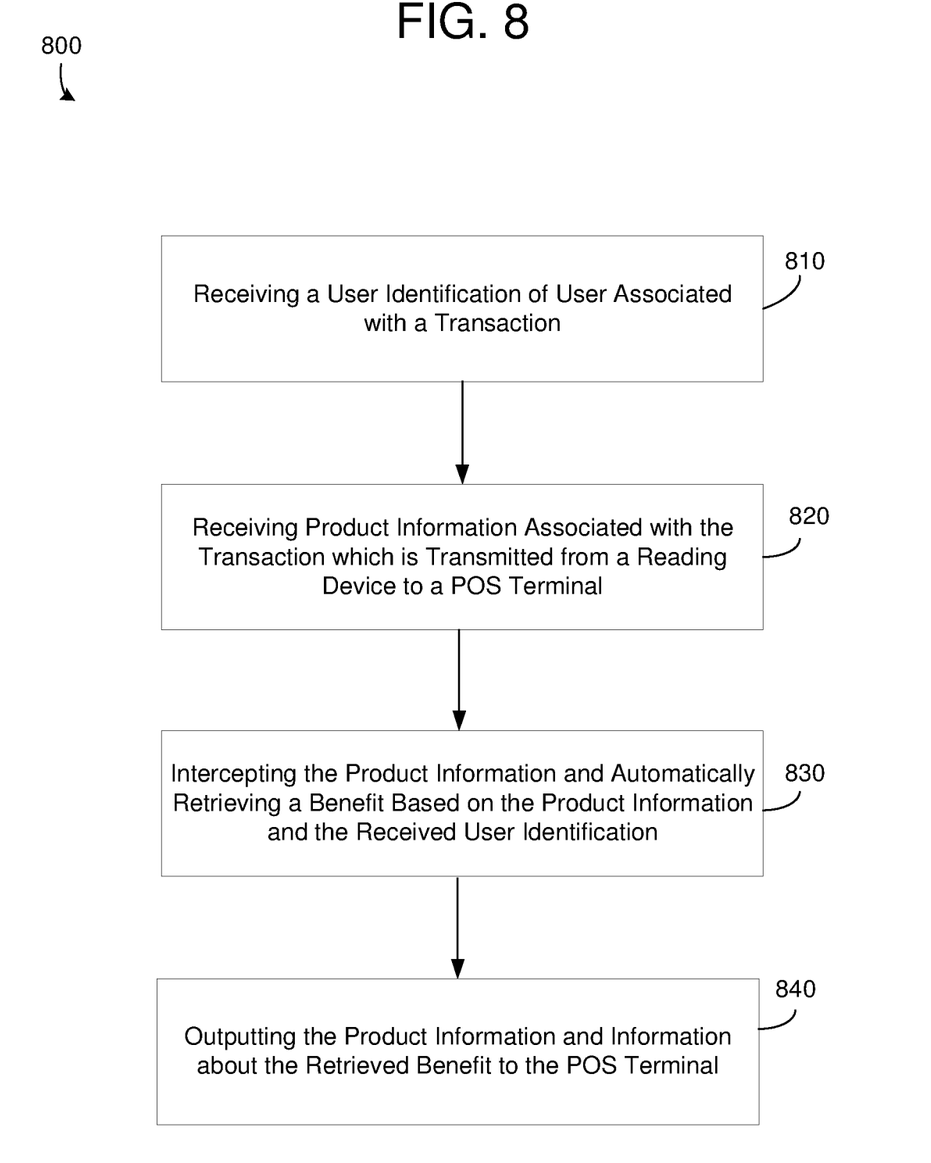
FIG. 8 is a diagram illustrating a method of performing a purchase transaction by a POS system in accordance with an example embodiment.

FIG. 8 illustrates a method 800 of performing a purchase transaction by a POS system in accordance with an example embodiment. For example, the method 800 may be performed by the MP2P apparatus shown in one or more of the examples herein. Referring to FIG. 8, in 810 the method includes receiving a user identification of a user associated with a transaction, and in 820, receiving product information associated with the transaction which is transmitted from a reading device to a point-of-sale (POS) terminal. As an example, the reading device may include a scanner or RFID reader and the product information may include one or more of a universal product code (UPC) and a quick response (QR) code of the product which is read by the reading device. The user identification may be received by a user scanning their ID card, loyalty card, rewards card, etc. via the reading device. As another example, the user identification may be input through a keypad of the apparatus or even by the clerk checking out the user.

In 830, the method includes intercepting the received product information as it is being transmitted between the reading device (e.g., product scanner) and the POS terminal, and automatically retrieving a benefit to be included in the transaction from a remote server based on the product information and the received user identification. According to various embodiments, the benefit may include one or more of a rewards program, a loyalty program, and a coupon, that is previously registered by a user account associated with the user identification, at the remote server, prior to the transaction being initiated at the reading device. The remote server may include a remote web server that hosts a mobile application, and the benefit may be previously transmitted to the remote web server by a user device associated with the user identification via the mobile application executing on the user device. Here, the user device may scan a coupon from a newspaper, a wall mounted QR code, a product barcode coupon, or the like. As another example, the user may register their reward program, digital wallet, or the like, at the mobile application host server by providing their information such as card number, contact information, and the like.

In order to trigger the benefit to be sent, the apparatus may transmit the product information and the user identification to the remote server. In response, the remote server may link the user identification to a user account stored at the remote server, and also determine whether that user account has any rewards, coupons, or the like, associated with the specific product that the user has previously uploaded or otherwise provided to the system. As another example, the remote server may add loyalty program or rewards program to the transaction based on the user identification without the product identification. The remote server may also provide the benefit to the apparatus in the form an URB thereby enabling the apparatus to insert or otherwise embed the URB into an URB received from the scanner when the product was scanned. The communication with the remote server may be performed via Hyper Text Transfer Protocol Secure (HTTPS) communication to protect any sensitive information (e.g., payment card numbers, CVV, expiry, user contact information, and the like). In 840 the method includes outputting the product information and information about the automatically retrieved benefit to the POS terminal.

In the example of FIG. 8, the product information may be received via a first USB port connected to a product scanner and the product information and the information about the automatically retrieved benefit are transmitted to the POS terminal via a second USB port. In this example, the apparatus may form a software wire between the product scanner and the POS Terminal. In response to receiving the USB signal from the product scanner, the apparatus may intercept/siphon off the USB signal being transmitted between the first and second USB ports. For example, the method may further include extracting an URB in its entirety from the USB signal while it is being transmitted between the first and second USB ports, and transmitting the extracted URB in its entirety to the remote web server. In addition, the method may further include receiving an URB from the remote web server and inserting the URB into the USB signal while it is being transmitted between the first and second USB ports.

Figure 9:
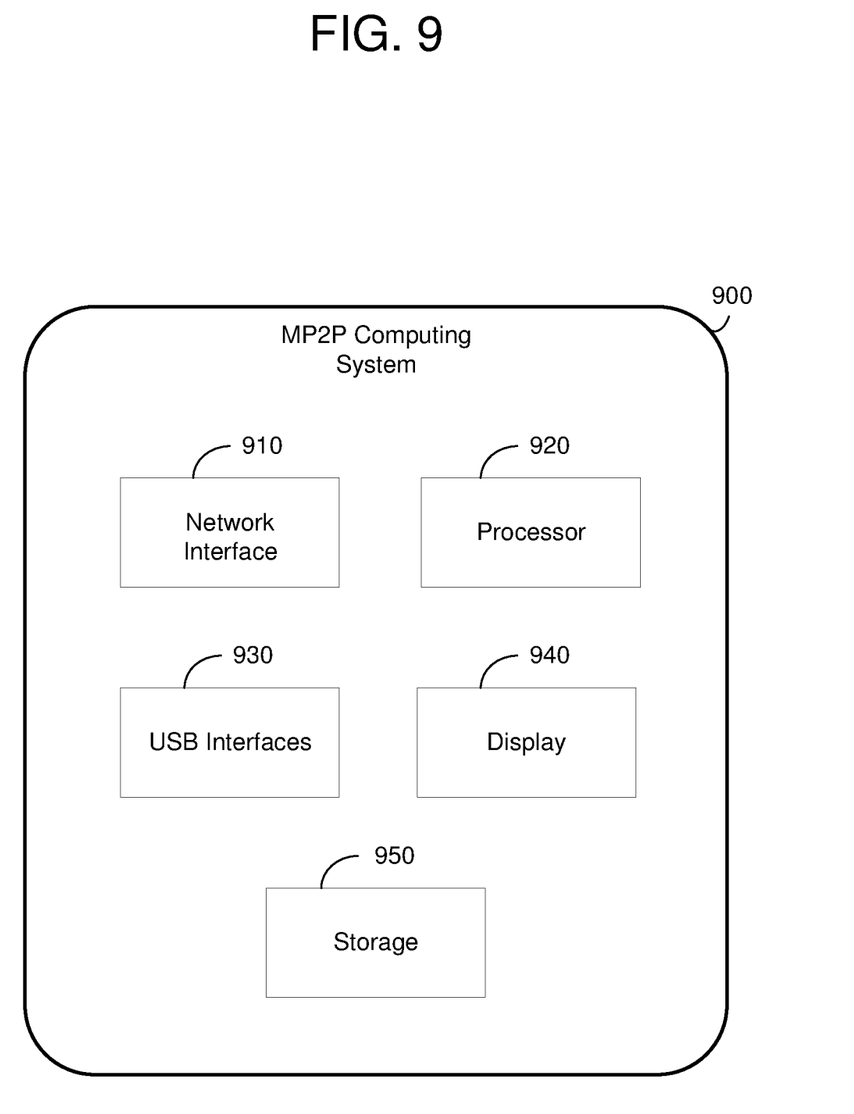
FIG. 9 is a diagram illustrating a computing system in accordance with example embodiment.

FIG. 9 illustrates a computing system 900 in accordance with an example embodiment. For example, the computing system 900 may be the multi-point-to-point apparatus described in one or more of the examples of FIGS. 1, 3, 4, 5, and 6. Also, the computing system 900 may perform the method 700 of FIG. 7 and the method 800 of FIG. 8. Referring to FIG. 9, the computing system 900 includes a network interface 910, a processor 920, a plurality of USB ports 930, a display 940, and a storage device 950. Although not shown in FIG. 9, the computing system 900 may include other components such as a housing, an input unit (e.g., keypad, voice recognition module, microphone, motion recognition, etc.), a receiver/transmitter, a circuit board, and the like. The network interface 910 may transmit and receive data over a network such as the Internet, a private network, a public network, and the like. The network interface 910 may be a wireless interface, a wired interface, or a combination thereof. The storage device 940 is not limited to any particular storage device and may include any known memory device such as RAM, ROM, hard disk, and the like.

Each USB port 930 may connect to a USB device and may input and output a USB signal. The USB ports 930 may be electrically connected to and may be controlled by the processor 920. The processor 920 may include one or more processing devices each including one or more processing cores. In some examples, the processor 920 may be a multicore processor or a plurality of multicore processors. Also, the processor 920 may be fixed or it may be reconfigurable. According to various embodiments, the processor 920 can inject or otherwise add a second USB signal into a first USB signal. For example, the processor 920 can add one or more URBs received from a second USB device to one or more URBs received from a first USB device, and output the combined signal to a third USB device. The combined signal may include the one or more URBs from the second USB device embedded within the one or more URBs from the first USB device. As another example, the processor 920 may append or prepend the one or more URBs received from the second USB device to the one or more URBs received from the first USB device.

In one example, a first USB port is connected to a product scanner and a second USB port is connected to a POS terminal. In this example, the computing system 900 may form a software wire between the product scanner and the POS terminal by extracting USB data (e.g., an URB in its entirety) from the product scanner and siphon off the URB to a remote server via the network interface 910, under the control of the processor 920. In this example, the siphoned USB input signal may include product information such as a UPC code, QR code, and the like, which is scanned by the first device such as a product scanner, or the like, and which is intended for a POS terminal. Here, the processor 920 may intercept the product information (not just the UPC code) but the entire URB associated with the scanning of the product, and transmit the URB in its entirety to the remote server.

In addition to receiving the first USB signal form the product scanner, the computing system 900 may also receive a user identification such as a loyalty card ID, a rewards card ID, a username, an email address, a phone number, or the like, which identifies a user who is involved in the purchase transaction of the product. The user identification may be associated with a digital wallet, a mobile application, and the like, which is hosted by the remote web server. The user identification may be extracted from the first USB signal in an example in which the first device scans a loyalty card, tag, or the like, or receives an input such as an email or a phone number from a user. As another example, the user identification may be input via a keypad/user interface of the computing system and displayed via the display 940. The display 940 may also display other deals and offers not involved in the transaction (e.g., girl scout cookies) which may be invoked by the user to initiate a transaction for the offered product directly from the computing system 900 without requiring the product to be scanned by a scanning device.

The processor 920 may control the network interface 910 to transmit the extracted product information and the user identification to the remote server. For example, an URB in its entirety may be extracted from the first USB input signal while leaving a payload of the URB within the first USB input signal unchanged, and the network interface 910 may transmit the extracted URB to the remote server.

A second USB input signal may be received by the network interface 910 from the remote server in response to the extracted product information and the user identification being transmitted to the remote server. The second USB input signal may include a benefit such as a rewards program, a loyalty program, a coupon, or the like, associated with a purchase transaction for the product scanned by the product scanner and identified by the first USB input signal. The mobile application hosted by the remote server may be installed on a user device of a consumer that is requesting purchase of the product scanned by the first device. In this example, the user identification may be used to identify or otherwise link a user of the mobile application to the product being purchased. The web server may also identify whether the user has any user-specific benefits (e.g., coupons, rewards, etc.) previously added to that user's account for the specific product the user is attempting to purchase. For example, the web server may determine an identification of the product from the product information (e.g., UPC code, product code, etc.) provided from the network interface of the apparatus. In response to determining the user has previously added or otherwise submitted a benefit associated with the product to the web server, the web server may transmit the benefit to the apparatus and the apparatus may automatically inject the benefit into the USB input stream scanned by the scanner and intended for the POS terminal.

In response to receiving the first and second USB signals from the product scanner and the remote server, respectively, the processor 920 may combine data from the first USB input signal and data from the second USB input signal to generate a combined USB data signal, and control the USB port connected to the POS terminal to output the combined USB data signal. According to various embodiments, the first and second USB input signals may be generated by a USB device driver of the first and second devices, respectively. The computing system 900 is designed such that it can receive multiple streams of USB data (e.g., from a product scanner, a remote server, etc.) and combine the multiple streams to generate a combined output signal. In other words, the computing system 900 is designed as a multi-endpoint-to-endpoint USB system.

According to various embodiments, the USB port connected to the first device (e.g., the product scanner) may form a software wire with the USB port connected to the output device (e.g., the POS terminal). In this example, the input port may receive the USB signal from the scanner and the output port may pass the received USB signal to the POS terminal such that a payload of the USB signal remains unchanged. In this case, the computing system 900 may siphon/extract data from the USB signal (e.g., product information, user information, etc.), send the siphoned data to a remote web server, and download and insert information into the signal (e.g., a reward, a benefit, a discount, etc.) while maintaining the payload of the USB signal as it passes from the input port to the output port. Accordingly, the apparatus may automatically download and apply discounts which are registered for by the user well in advance (e.g., one day, one week, one month, and the like).

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A multi-point-to-point apparatus comprising:
 a first input configured to receive a first universal serial bus (USB) input signal comprising a first USB resource block (URB) from a first device that is connected to the first input;
 a second input configured to receive a second USB input signal comprising a second URB from a second device that is connected to the second input;
 a processor configured to combine the first URB from the first USB input signal and the second URB from the second USB input signal to generate a combined USB data signal, wherein the processor performs by combining by at least one of appending the second URB to the first URB, prepending the second URB to the first URB, and embedding the second URB within the first URB; and
 an output configured to output the combined USB data signal to a third device that is connected to the output.

2. The apparatus of claim 1, wherein the first USB input signal is generated by a USB device driver of the first device, and the second USB input signal is generated by a USB device driver of the second device.

3. The apparatus of claim 1, wherein the first input comprises a USB port that connects the apparatus to the first device via a cable, the second input comprises a network interface that connects the apparatus to the second device via a network, and the output comprises another USB port that connects the apparatus to the third device via another cable.

4. The apparatus of claim 3, wherein the first device comprises a product scanner, the second device comprises a web server, and the third device comprises a point-of-sale (POS) terminal.

5. The apparatus of claim 1, wherein the processor is configured to generate the combined USB data signal by at least one of appending the second URB to the first URB and prepending the second URB to the first URB.

6. The apparatus of claim 1, wherein the processor is configured to generate the combined USB data signal by embedding the second URB within the first URB.

7. The apparatus of claim 1, wherein the processor is further configured to extract the first URB in its entirety from the first USB input signal while leaving a payload of the first URB within the first USB input signal unchanged, and transmit the extracted first URB to the second device.

8. An apparatus comprising:
 a first input configured to receive a first universal serial bus (USB) input signal from a first device that is connected to the first input;
 a second input configured to receive a second USB input signal from a second device that is connected to the second input;

a processor configured to combine data from the first USB input signal and data from the second USB input signal to generate a combined USB data signal; and an output configured to output the combined USB data signal to a third device that is connected to the output, wherein the processor is further configured to receive a user identification associated with the first USB input signal, and transmit the received user identification to the second device.

9. The apparatus of claim 8, wherein the second USB input signal received from the second device is associated with a mobile application on a user device that is identified by the received user identification.

10. A method of a multi-point-to-point device, the method comprising:
receiving, via an input port, a first universal serial bus (USB) input signal comprising a first USB resource block (URB) from a first device that is connected to the input port;
receiving, via an interface, a second USB input signal comprising a second URB from a second device;
combining the first URB from the first USB input signal and the second URB from the second USB input signal to generate a combined USB data signal, wherein the combining comprises at least one of appending the second URB to the first URB, prepending the second URB to the first URB, and embedding the second URB within the first URB; and
outputting, via an output port, the combined USB data signal to a third device that is connected to the output port.

11. The method of claim 10, wherein the first USB input signal is generated by a USB device driver of the first device, and the second USB input signal is generated by a USB device driver of the second device.

12. The method of claim 10, wherein the input port comprises a USB port that connects to the first device via a cable, the interface comprises a network interface that connects to the second device via a network, and the output port comprises another USB port that connects to the third device via another cable.

13. The method of claim 10, wherein the generating the combined USB data signal comprises at least one of appending the second URB to the first URB and prepending the second URB to the first URB.

14. The method of claim 10, wherein the generating the combined USB data signal comprises embedding the second URB within the first URB.

15. The method of claim 10, wherein the method further comprises extracting the first URB in its entirety from the first USB input signal while leaving a payload of the first URB within the first USB input signal unchanged, and transmitting the extracted first URB to the second device.

16. The method of claim 10, wherein the method further comprises receiving a user identification associated with the first USB input signal, and transmitting the received user identification to the second device.

17. The method of claim 16, wherein the second USB input signal received from the second device is associated with a mobile application on a user device that is identified by the received user identification.

18. A non-transitory computer readable storage medium having program instructions which, when executed by a processor, are configured to control the processor to perform a method comprising:
receiving, via an input port, a first universal serial bus (USB) input signal comprising a first USB resource block (URB) from a first device that is connected to the input port;
receiving, via an interface, a second USB input signal comprising a second URB from a second device;
combining the first URB from the first USB input signal and the second URB from the second USB input signal to generate a combined USB data signal, wherein the combining comprises at least one of appending the second URB to the first URB, prepending the second URB to the first URB, and embedding the second URB within the first URB; and
outputting, via an output port, the combined USB data signal to a third device that is connected to the output port.

* * * * *